March 29, 1966    R. E. FULTZ ETAL    3,242,511
POROUS AIR COOLED CUSHIONING MEMBER
Filed July 12, 1963    2 Sheets-Sheet 1

INVENTORS
RUSSELL E. FULTZ
THOMAS TROGDON
ABRAHAM L. FREEDLANDER

BY Reuben Wolf
ATTORNEY

March 29, 1966  R. E. FULTZ ETAL  3,242,511
POROUS AIR COOLED CUSHIONING MEMBER
Filed July 12, 1963  2 Sheets-Sheet 2

INVENTORS
RUSSELL E. FULTZ
THOMAS TROGDON
ABRAHAM L. FREEDLANDER
BY
ATTORNEY

United States Patent Office 3,242,511
Patented Mar. 29, 1966

3,242,511
POROUS AIR COOLED CUSHIONING MEMBER
Russell E. Fultz, Lake Junaluska, and Thomas Trogdon, Waynesville, N.C., and Abraham L. Freelander, Dayton, Ohio, assignors to Dayco Corporation, Dayton, Ohio, a corporation of Ohio
Filed July 12, 1963, Ser. No. 294,571
4 Claims. (Cl. 5—348)

This invention relates to cushioning members, such as pillows, furniture cushions, and the like, and more particularly to members formed of cellular resilient elastomeric materials, such as latex rubber foam, urethane foam, vinyl foam and other plastic foams, into which a porous inflatable member may be inserted.

Cushioning members are normally fabricated by molding the cellular material into articles of desired size and shape, although it is possible to manufacture them by cutting from blocks of foam material. The most widely used pillows and cushions of this type are latex foam rubber, and are made by molding mating or matching halves with core openings extending inwardly from the surface. These halves are then united by cementing the cored surfaces to form a finished product in which the external surface is relatively smooth. The core openings reduce the amount of material and help control the cushioning characteristics of the finished product. Materials and processes of this type are described in United States Patent No. 2,432,353. In the case of urethane foams, it is possible to introduce a reactive mixture in the mold, creating a reaction while polymerization and foaming occur.

In order to increase the comfort value of a cushioning member and particularly a pillow used for sleeping, the inventors have conceived the principle of providing air movement in a manner which simulates the effect of air cooling. To this end an inflatable porous member may be inserted between the two halves of the pillow and inflated during use so that the air within the member gradually seeps from the inflatable member and through the body of the cellular pillow in a slow but steady manner. The cellular elastomeric material, such as latex foam rubber and the other materials referred to, must be of an interconnecting cell type of structure so that this air leakage is possible. As a further aspect of the invention, the two halves or segments of the pillow will be permanently sealed at only certain of the edges while the remaining edge or edges will be temporarily sealed. This permits the porous bladder to be inserted through the temporarily sealed edges which are subsequently resealed; at any time the user may then remove the porous bladder and replace it with one having different characteristics, or omit the bladder entirely so that the pillow may have a conventional construction.

It is, therefore, a principal object of this invention to provide a pillow into which a porous inflatable member may be inserted.

It is a further object to provide a means for gradually flowing air from the porous inflatable member through the body of the pillow for comfort and cooling.

It is still another object of the invention to provide a cushioning member which may be partially opened and resealed for the insertion of the porous inflatable member.

These and other objects will be readily apparent from the following specification and drawings, in which.

Figure 1:
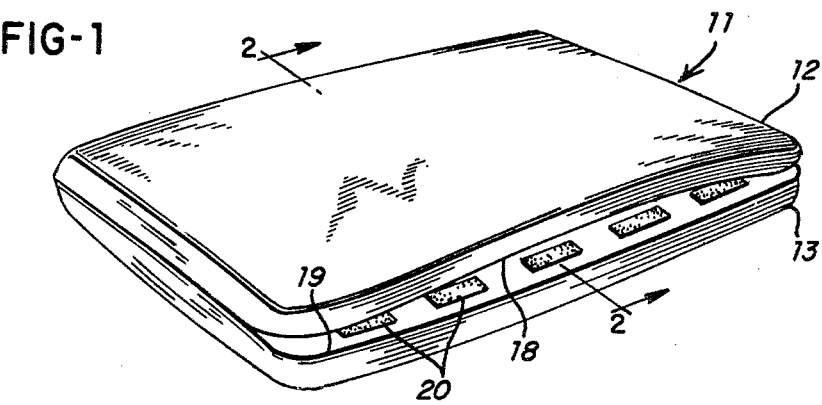
FIGURE 1 is an isometric view of a pillow prior to inserting the porous inflatable member.
Figure 2:
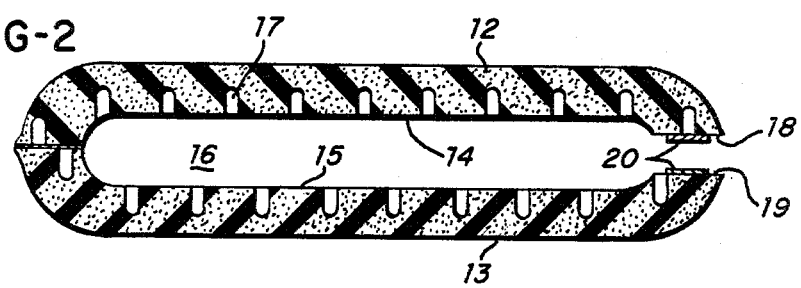
FIGURE 2 is a sectional view, taken along line 2—2 of FIGURE 1.

Turning now to the drawings, FIGURE 1 illustrates a cellular elastomeric pillow or cushion 11 formed of matching upper and lower halves or segments 12 and 13 respectively. Assuming that this product is manufactured of latex foam rubber, the two halves will have been fabricated in molds which are identical so that the pillow halves are also identical and will be capable of perfect mating when brought together. Each half is molded with corresponding cavities 14 and 15 so that when the halves are superimposed as shown in FIGURE 2 a complete hollow cavity 16 will be formed. Also molded within the halves are a number of cores 17 which have been formed by providing pins in the mold; the purpose of these cores is to reduce the weight and density of the material.

As shown in FIGURE 1 three of the edges of the halves 12 and 13 are sealed to form a permanent bond. This is done by applying a suitable adhesive to one or both halves and pressing them together; the adhesive may then be air cured or heat cured to create the permanent bond between the mating edge areas and is conventional in the art. The fourth mating edge areas 18 and 19, however, are not treated as are the other halves; as shown in FIGURES 1 and 2 the edges 18 and 19 are illustrated as being slightly separated for purposes of illustrating this feature. In lieu of the permanent adhesive a plurality of separable but resealable sealing members 20 are located at opposed areas of edges 18 and 19. According to one form of the invention these segments 20 may consist of pressure sensitive adhesive on both surfaces as shown, or one one surface only. A little pressure against the edges will cause these adhesive segments to become adhered and form a temporary but satisfactory closure means. It is only necessary to pull the edges apart to reopen them by breaking the adhesive bond. The pressure sensitive adhesive segments may be added by spraying or rolling the adhesive, or by using double faced adhesive strips in which a permanent adhesive is applied against the edge of the foam member, while a temporary adhesive is exposed for sealing purposes.

Figure 3:
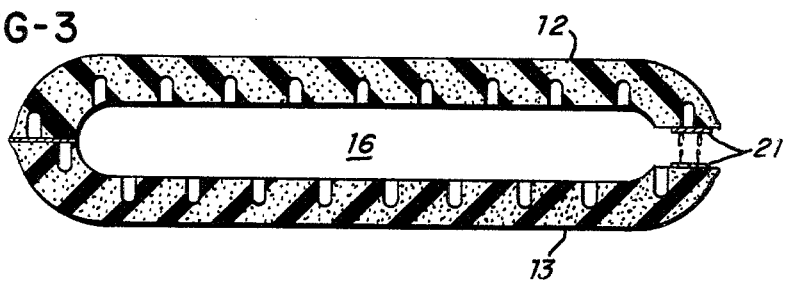
FIGURE 3 is a sectional view, similar to FIGURE 2, illustrating a modified form of the invention.
Figure 4:
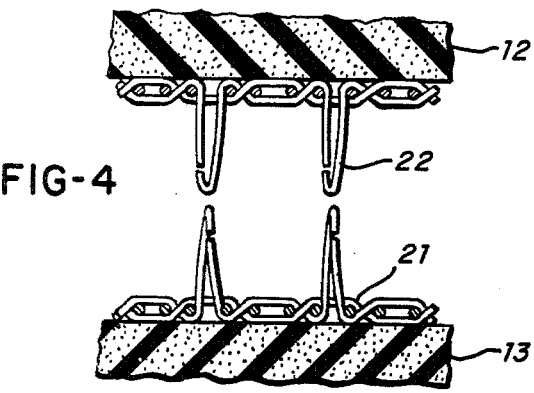
FIGURE 4 is a fragmentary view of a portion of the device of FIGURE 3.

FIGURE 3 illustrates a variation in the above sealing method in which the pillow halves 12 and 13 are provided with segments of a closure device consisting of a fabric having hook-like members extending outwardly therefrom. Each of these segments is designated by reference numeral 21 and may be applied to opposed areas of each of the edges 18 and 19. The structure of this closure means is shown in greater detail in FIGURE 4 in which it is apparent that the fabric, preferably made of nylon, is essentially a velvet type material in which certain of the pile threads have been floated out of the surface to create a loop which is subsequently cut to form a hook 22. The resulting fabric is one containing dozens of tiny hooks per square inch, so that as the edges 18 and 19 of the foam member are forced together the hooks will tend to interengage and form a secure closure. When it is desired to separate the edges, however, it is only necessary to pull them apart as before and the hooks will release without damage because of the resilience of the nylon material. This closure means is highly effective and has been found to provide many thousands of openings and closings without affecting the properties of the hooks.

Figure 5:
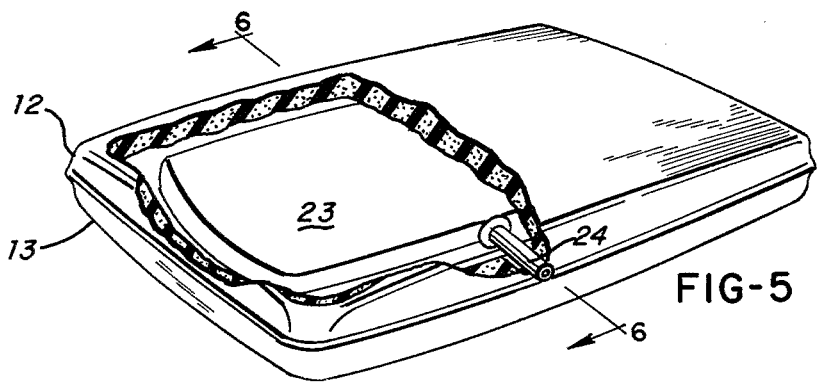
FIGURE 5 is a perspective view in partial section, illustrating a further stage of the invention.
Figure 6:
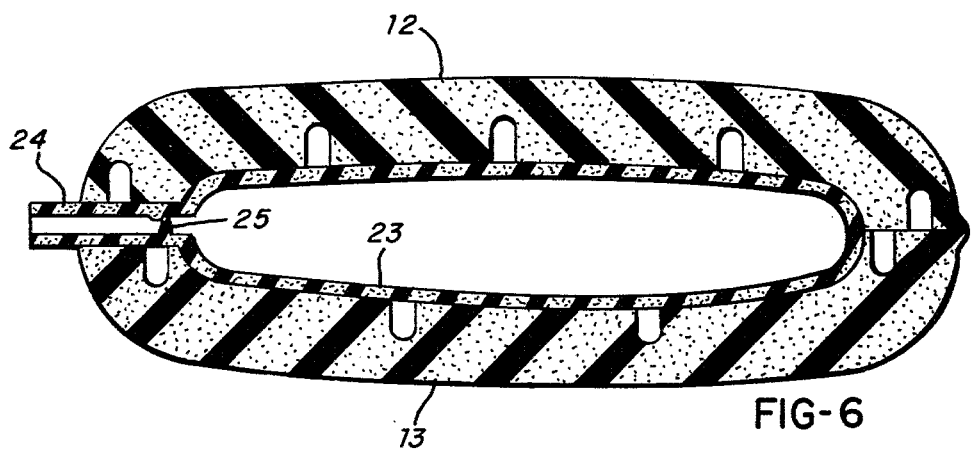
FIGURE 6 is a sectional view, taken along line 6—6 of FIGURE 5, illustrating a final form of the invention.

In accordance with the above description a pillow or cushion has now been provided in which three of the edges are permanently fastened while the fourth edge is capable of repeated separation and closure. Of course, it should be understood that if desired, two, three or even all four of the edges of the pillow or cushion halves may be temporarily fastened in the same manner instead of having them permanently fastened. Within the interior of this pillow or cushion is a cavity 16 extending throughout the major area of the interior. A porous bladder or inflatable member 23 may be inserted between the pillow halves 12 and 13 by separating the edges 18 and 19, as shown in FIGURES 5 and 6. The bladder is made of porous resilient elastomeric material similar to that of the cushioning member itself; that is, latex foam rubber, urethane, foam, or plastic foam.

When retiring for the night, the user will inflate the porous bladder within the pillow. During the night the air will gradually be dissipated through the porous bladder and through the body of the pillow, both of which have a stereoreticulate structure such as described in the aforesaid patent No. 2,432,353 (with reference to latex foam rubber); or United States Patent No. 3,025,200 (with reference to urethane foam).

The gradual dissipation over an eight hour period provides a cooling effect which enhances the comfort of the user. The density and internal structure of the bladder is such that the air will be released at an even rate throughout the sleeping period.

An additional feature of the invention lies in the fact that the bladder may be inserted and removed from between the pillow halves as desired. The user may insert the bladder, seal the edges 18 and 19, and inflate the bladder by means of the stem 24 which extends through the side of the pillow between edges 18 and 19. In the stem is incorporated a valve 25 so that air will not be lost through the stem. If it is desired to replace the bladder with one of different characteristics, it is only necessary to separate the edges 18 and 19, remove the bladder, insert a new one, and reseal the edges. If desired, the bladder may be omitted entirely.

By means of this invention, therefore, a pillow or cushion is provided in which a porous bladder is provided within the body to permit comfort cooling by gradual dissipation. The bladder may be removed or inserted within the body at will.

We claim:

1. A cushioning member comprising matching halves formed of stereoreticulate structure, said halves joined together and defining a central cavity, and an inflatable bladder of similar structure disposed within said cavity, the entire surface of said bladder being porous.

2. The cushioning member of claim 1 in which the structure of said halves and bladder is latex foam rubber.

3. The cushioning member of claim 1 in which the structure of said halves and bladder is urethane foam.

4. The cushioning member of claim 1 in which said bladder has a valve attached thereto for control of air passage.

References Cited by the Examiner

UNITED STATES PATENTS

| | | | |
|---|---|---|---|
| 2,045,036 | 6/1936 | Lenz | 5—347 |
| 2,059,226 | 11/1936 | Gates | 5—347 |
| 2,072,570 | 3/1937 | Smith | 5—348 |
| 2,234,506 | 3/1941 | Sistig | 5—338 |
| 2,750,606 | 6/1956 | Freedlander | 5—337 |
| 3,121,886 | 2/1964 | Seymour | 5—337 |

FRANK B. SHERRY, *Primary Examiner.*

A. M. CALVERT, *Assistant Examiner.*